United States Patent [19]

Michel et al.

[11] Patent Number: 5,030,430

[45] Date of Patent: Jul. 9, 1991

[54] PREPARATION OF PHOSPHATES BY INDUCTION MELTING

[75] Inventors: Paul Michel, Lyons; Francoise Seon, Fontenay/Sous/Bois; Rene Perrier de la Bathie, Saint Pierre d'Albigny, all of France

[73] Assignee: Rhone-Poulenc Chimie, Courbevoie, France

[21] Appl. No.: 379,558

[22] Filed: Jul. 13, 1989

[30] Foreign Application Priority Data

Jul. 13, 1988 [FR] France ................ 88 09530

[51] Int. Cl.$^5$ ............... C01B 25/10; C01B 25/39; C01B 25/41; C01B 25/445
[52] U.S. Cl. ................... 423/300; 423/301; 423/305; 423/314; 423/315
[58] Field of Search ............ 423/305, 314, 315, 300, 423/301

[56] References Cited

U.S. PATENT DOCUMENTS

| | | | |
|---|---|---|---|
| 4,346,028 | 8/1982 | Griffith | 423/314 |
| 4,360,625 | 11/1982 | Griffith | 423/314 |
| 4,610,017 | 9/1986 | Bathie et al. | 373/156 |
| 4,690,809 | 9/1987 | Nathan et al. | 423/314 |

FOREIGN PATENT DOCUMENTS 2595716 9/1987 France.

OTHER PUBLICATIONS

John H. Perry, *Chemical Engineers' Handbook*, Fourth Edition (1963), McGraw-Hill Book Co., pp. 25-41 through 25-43.

*Primary Examiner*—Wayne A. Langel
*Attorney, Agent, or Firm*—Burns, Doane, Swecker and Mathis

[57] ABSTRACT

Phosphates, e.g., the polyphosphates and halophosphates, are prepared in high purity by melt thermocondensing corresponding precursors thereof, e.g., salts of orthophosphoric, pyrophosphoric or metaphosphoric acid, via electromagnetic induction heating, for example in an auto-crucible furnace.

22 Claims, No Drawings

PREPARATION OF PHOSPHATES BY INDUCTION MELTING

BACKGROUND OF THE INVENTION

1. Field of the Invention

The present invention relates to a novel process for the preparation of phosphates by a particular melting operation, as well as to the phosphates produced by such novel process. More especially, this invention relates to the preparation of phosphates by electromagnetic induction melting of precursors thereof.

2. Description of the Prior Art

It is known to this art that certain phosphates may be produced by melting certain precursors thereof. Thus, halophosphates, which are salts of the anion $PO_3X^{2-}$, in which formula X is a halogen, may be prepared by melting.

These salts are typically prepared by melting precursors which may be, on the one hand, salts of orthophosphoric acid, pyrophosphoric acid or metaphosphoric acid and, on the other, halide salts, such as alkali metal or alkaline earth metal halides and, in particular, sodium fluoride.

In the same manner, it is also known to this art that phosphates of the polyphosphate type, which are polymers of orthophosphates or pyrophosphates, too may be produced by melting the precursors thereof. Among the polyphosphates which can be produced by melting, those of the following categories are illustrative:

(i) the tripolyphosphates, which are salts of tripolyphosphoric acid (of which only the salts are known) of the formula: $H_5P_3O_{10}$; and (ii) the metaphosphates, which are salts of metaphosphoric acids of the formula $(HPO_3)_n$, in which n is an integer (when n is equal to 3 or 4, the acid or its salt is in the cyclic form and, when n is greater than or equal to 5, the acid or its salt is in the linear form).

The polyphosphates may be prepared by melting orthophosphates.

Under the action of heat, the orthophosphates condense until the desired polymer is produced. However, other precursors may also be used.

Thus, tripolyphosphates may be produced by melting pyrophosphates, and metaphosphates by melting pyrophosphates, tripolyphosphates or other metaphosphates.

In this case too, the phenomenon which takes place is one of condensation under the influence of heat (or thermocondensation). This thermocondensation is accompanied by a release of water vapor.

In general, the phosphates are salified with one or more metallic elements.

The amount and the nature of these metallic elements may result from the phosphate precursors described above, but may also result from other precursors such as inorganic salts, for example, the halide salts indicated above, or alkali metal or alkaline/earth metal salts.

To date, the preparation of phosphates by melting has been carried out using furnaces of the glass furnace type. However, these furnaces present a number of drawbacks.

Thus, these large-sized furnaces are provided with walls fabricated from bricks of refractory materials bonded together by a cement. The refractory material is typically zircon.

As a result of this, the phosphates produced using these furnaces are always polluted or contaminated with zirconium, which can render them of little value in certain fields of application, for example, in agrochemicals and in foodstuffs.

On the other hand, these furnaces do not present the advantage of being multipurpose. Thus, if such furnaces have been used to prepare, for example, a polyphosphate of a metallic element, the later use of the same furnace to prepare a polyphosphate of another metallic element results, again, in pollution. In effect, trace amounts of the metallic element from the first polyphosphate will remain present in the glass furnace. When the latter is used to prepare the other polyphosphate, these trace amounts will reduce its purity. Because of this fact, a single glass furnace is generally used, without disadvantage, only for the preparation of a single phosphate.

In addition, it has been found that, when such furnaces are used for the production of corrosive materials, such as the halophosphates and certain polyphosphates, they become corroded and perforated after a certain period of time of use. This perforation would essentially appear to be caused by an attack by said corrosive materials on the cement bonding the bricks of the furnace.

It will also be appreciated that glass furnaces require large amounts of energy, thus rendering the cost of the materials to be prepared relatively high, and that, because of their large dimensions, several hours, if not several days, are necessary before melting temperatures are attained.

SUMMARY OF THE INVENTION

Accordingly, a major object of the present invention is the provision of an improved melt process for the preparation of phosphates which are not polluted or contaminated with zirconium values, and which improved process conspicuously avoids those disadvantages and drawbacks to date characterizing the state of this art.

Another object of this invention is the provision of an improved process which permits the preparation, successively, in the same furnace, of phosphates of different metallic elements. In addition, such improved process is relatively economical in terms of energy requirements, and may be carried out rapidly using only a restricted space.

Briefly, the present invention features a process for the preparation of phosphates by melting the precursors thereof, and wherein such melting is carried out by electromagnetic induction.

DETAILED DESCRIPTION OF THE PREFERRED EMBODIMENTS OF THE INVENTION

More particularly according to the present invention, the precursor melting is advantageously carried out by high frequency electromagnetic induction.

It is found that the preparation of phosphates by melting, generally implying the thermocondensation of precursors of said phosphates, results in a release of water into the melting bath (accordingly, by "thermocondensation" is intended condensation of precursors under the influence of heat, such condensation being expressed, in particular, by a release of water).

Now, it is known to this art that the presence of water under such conditions results in a considerable increase in the resistivity of the melt. Thus, it follows that such release of water would be expected to exert negative influence on a process for the preparation of phosphates by induction melting.

Quite surprisingly and unexpectedly, however, it has now been found that the preparation of phosphates by induction melting can indeed be carried out without impediment.

Thus, the present invention broadly features a process for the preparation of compounds by melting and thermocondensation of precursors of said compounds, wherein the melting and the thermocondensation are carried out by electromagnetic induction.

According to this invention, the melting is preferably carried out in an induction furnace, which may advantageously be operated in continuous fashion.

Auto-crucible induction furnaces are exemplary of suitable induction furnaces. These furnaces are characterized in that an isolating crust (or auto-crucible) is formed on the wall members thereof, such crust being constituted of the product which is under preparation.

Cold-crucible furnaces, described in other respects in the prior art, may serve as auto-crucible furnaces.

Cold-crucible furnaces generally comprise, on the one hand, a pot made of a material which is a good conductor of heat, such as copper, whose walls are cooled by circulation of a cooling liquid such as water, and, on the other hand, a coil through which a high frequency induction passes.

Certain cold-crucible furnaces may be used continuously. Thus, published French Patent Application No. 2,595,716 describes a furnace, the base of which is provided with an orifice through which flow the products prepared by the melting operation.

Advantageously, the type of auto-crucible furnace known as direct-coil(s) is used according to the invention. These furnaces comprise one or more coils of a conducting material such as copper, cooled by circulation of a cooling liquid, such as water. The coil or coils, through which a high frequency induction current passes, themselves constitute the walls of the furnace.

Generally, direct-coil furnaces have the advantage, compared with cold-crucible furnaces, of a lower consumption of electricity and a better heat efficiency.

In a preferred embodiment of the invention, single-coil induction furnaces are used. Thus, it has been found that a furnace such as described in European Patent No. 119,887 permits very good results to be obtained. This furnace has a cylindrical wall which is cut along a helical line, forming a single flat coil having several turns. This furnace may be used continuously.

According to the process of the invention, the precursors of the phosphates to be prepared are introduced into the induction furnace. The precursors may, for example, be in the form of a powder, or possibly of a paste.

The induction current passing through the walls of the furnace permits the said precursors to be heated by electromagnetic induction until they melt.

Advantageously, the melting of the precursors is commenced by means of an initiator.

This initiator may be, for example, a bar or a crown of a material such as platinum, zirconium or graphite, which is introduced into the mass of the charge of precursors. The initiator heats a certain amount of precursors by convection, then is withdrawn from the mass. Generally, the initiator is withdrawn as soon as 30% to 60% of said mass is molten. Melting is then carried out by electromagnetic induction only.

The fact that the initiator may comprise zirconium results only in a slight pollution of the final products.

Indeed, the initiator is withdrawn sufficiently rapidly to pollute only a very small proportion of the final products, and only in the first phase of production. Preferably, the initiator is nonpolluting graphite; further, such an initiator is only slightly consumed.

Because of vigorous cooling, a crust of phosphates, which will isolate the melting product from the walls of the furnace, is rapidly formed on the internal walls of the furnace. The melting product may then be recovered by decantation.

The furnace may be continuously charged with fresh precursors, for example by means of a vibrating hopper, at the same rate that the final product is recovered.

A preferred embodiment of the process of the invention entails carrying out the precursor melting in the presence of the thermocondensed product previously melted in the furnace. The volume of the melted thermocondensed product used must be sufficient to create an induction heating and a thermal mass capable of melting the precursors introduced subsequently. This embodiment allows the precursors to melt more quickly and avoids condensation of the stream on the walls of the furnace.

Once one particular operation for the preparation of a phosphate according to the invention is completed, a fresh operation may then be carried out in the same furnace for the preparation of a different phosphate.

In order to do this, it is sufficient to break the crust which has formed on the walls of the furnace and to introduce into the furnace the precursors of the "new" product to be prepared.

In a secondary embodiment of the invention, the internal walls of the furnace, into which the precursors are introduced, may be covered with a layer of a refractory material. Zircon or silica are exemplary of such refractory material.

Therefore, it is on this layer and no longer directly onto the walls of the furnace, that the crust constituted of the desired final products will form.

Again, the fact that this layer may include zircon values affects the purity of the final product only very slightly. This because a crust of said phosphates will form very quickly on the layer of zircon, isolating the latter from the melting materials.

Hence, only the phosphates produced at the very beginning of the process are subject to slight pollution by zirconium.

Generally, the induction current necessary to carry out the melting of the precursors of the phosphates to be prepared has a frequency ranging from 50 hertz to 500 kilohertz and preferably from 5 to 40 kilohertz.

The halophosphates and the polyphosphates are representative phosphates which can be prepared by the melt process of the invention.

The fluorophosphates of at least one alkali metal or alkaline earth metal, and more particularly disodium monofluorophosphate, are representative halophosphates.

Exemplary polyphosphates which may be prepared according to the process of the invention include the tripolyphosphates and the metaphosphates, such as sodium hexametaphosphate, sodium pentapolyphosphate and sodium tetrapolyphosphate. All of these salts contain at least one metallic element.

The alkali metals or the alkaline earth metals, aluminum, copper, vanadium and iron are particularly representative of such metallic elements.

The present invention also features the phosphates, per se, and in particular, the halophosphates and the polyphosphates prepared by melting their precursors according to the process described above.

In order to further illustrate the present invention and the advantages thereof, the following specific examples are given, it being understood that same are intended only as illustrative and in nowise limitative.

EXAMPLE 1

Process for the preparation of sodium hexametaphosphate

An initial charge of 110 kg sodium hexametaphosphate was introduced into an auto-crucible induction furnace having a single coil, such as that described in European Patent No. 199,877, which had an internal diameter of 600 mm and a height of 300 mm and the internal walls of which were covered with a layer of zircon. The furnace was heated by a generator having a power of 50 kwatt operating at a 35 kilohertz frequency. A zirconium initiator, to initiate the melting process was introduced into this charge. This initiator was withdrawn from the melting bath after about 2 hours, and the apparatus was then continuously charged with disodium acid pyrophosphate.

The starting material introduction was carried out by means of a vibrating hopper, at a rate of 60 to 80 kg/hour. The sodium hexametaphosphate produced was continuously recovered by decantation into an ingot mold, and then cooled.

Production of sodium hexametaphosphate was at a rate of about 80 kg/hour.

The final product was ground, after cooling, by means of a disk mill, and analyzed.

This product had the following characteristics:
 (a) a mean chain length of 23;
 (b) a percentage by weight of $P_2O_5$ greater than 65%;
 (c) an absence of products whose chain length ranged from 1 to 3; and
 (d) an amount of insoluble matter of zero.

The pH of a 1% by weight aqueous solution of the sodium hexametaphosphate thus produced was 6.25.

EXAMPLE 2

Process for the preparation of sodium pentapolyphosphate

An initial charge of 120 kg of sodium pentapolyphosphate was introduced into the same furnace as that of Example 1, heated by the same induction current.

A zirconium initiator was introduced. After two hours the initiator was withdrawn. The furnace was then continuously charged with mono- and disodium orthophosphates, the $NaH_2PO_4/NaHPO_4$ molar ratio of which was 2 by means of a vibrating hopper, at a rate of 60 to 80 kg/hour.

The sodium pentapolyphosphate produced was continuously recovered by decantation into an ingot mold, and then cooled.

The rate of production of the sodium pentapolyphosphate was 80 kg/hour.

The cooled product was ground with a disk mill and analyzed.

The product obtained had the following characteristics:

(a) a mean chain length of from 4.5 to 5.25;
 (b) a Na/P ratio of 1.31;
 (c) a glass density of 2.45.

A 1% aqueous solution of this sodium pentapolyphosphate had a pH of 7.8.

EXAMPLE 3

Process for the preparation of disodium monofluorophosphate ($Na_2PO_3F$)

70 kg of an initial charge of 71% sodium hexametaphosphate and 29% sodium fluoride were introduced into the same furnace as that of Example 1, heated by the same induction current.

These precursors were heated to their melting point by means of a graphite initiator.

After 75 min, the initiator was withdrawn and the furnace was continuously charged with a powder of the same nature as that described above.

This introduction was carried out by means of a vibrating hopper, at a rate of 60 to 80 kg/h.

After about 2 hours, the final product was recovered continuously by decantation into an ingot mold, and then cooled.

The product analyzed had a disodium monofluorophosphate content of 86%.

A 1% aqueous solution of the final product had a pH of 7.8.

EXAMPLE 4:

Process for the preparation of sodium tetrapolyphosphate ($Na_6P_4O_{13}$)

80 kg of an initial charge of sodium monophosphate and sodium diphosphate, the $NaH_2PO_4/Na_2HPO_4$ molar ratio of which was 1.38, were introduced into the same furnace as that of Example 1, heated by the same induction current. The precursors were heated to their melting point by means of a graphite initiator.

After 75 min, the initiator was withdrawn and the furnace was continuously charged with a powder of the same nature as that described above.

This introduction was carried out by means of a vibrating hopper, at a rate of 60 to 80 kg/h.

After about 2 hours, the final product was recovered continuously by decantation into an ingot mold, and then cooled.

The product obtained had the following characteristics:
 (a) a mean chain length of from 3.9 to 4.3;
 (b) a Na/P molar ratio of $1.38 \pm 0.01$;
 (c) pH of a 1% aqueous solution = 8.05;
 (d) % of $P_2O_5 = 59.85 \pm 0.5$.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a phosphate, comprising melt thermocondensing corresponding precursor of such phosphate by electromagnetic induction heating.

2. The process as defined by claim 1, carried out in an auto-crucible furnace.

3. The process as defined by claim 2, carried out in a cold-crucible furnace.

4. The process as defined by claim 2, carried out in a direct-coil furnace.

5. The process as defined by claim 4, carried out in a single-coil furnace.

6. The process as defined by claim 1, said melt thermocondensation being by high frequency electromagnetic induction.

7. The process as defined by claim 1, carried out continuously.

8. The process as defined by claim 1, carried out in the presence of previously melt thermocondensed desired final product.

9. The process as defined by claim 1, comprising melt thermocondensation utilizing an induction current having a frequency ranging from 50 hertz to 500 kilohertz.

10. The process as defined by claim 9, said frequency ranging from 5 to 40 kilohertz.

11. The process as defined by claim 1, carried out in an induction furnace, the internal wall members of which being provided with a layer of a refractory material.

12. The process as defined by claim 11, said refractory material comprising zircon or silica.

13. The process as defined by claim 1, said phosphate precursor comprising a powder or paste.

14. The process as defined by claim 1, said phosphate precursor comprising a salt of orthophosphoric acid, pyrophosphoric acid or metaphosphoric acid.

15. The process as defined by claim 14, comprising preparation of a polyphosphate.

16. The process as defined by claim 15, comprising preparation of a tripolyphosphate.

17. The process as defined by claim 14, comprising preparation of a halophosphate.

18. The process as defined by claim 14, comprising preparation of a metaphosphate.

19. The process as defined by claim 14, comprising preparation of sodium hexametaphosphate, sodium pentapolyphosphate, sodium tetrapolyphosphate, or disodium monofluorophosphate.

20. The process as defined by claim 1, first carried out in the presence of a melt initiator.

21. The process as defined by claim 20, said melt initiator comprising platinum, zirconium or graphite.

22. The process as defined by claim 20, comprising removing said melt initiator after 30% to 60% of said phosphate precursor has been melted.

* * * * *